United States Patent
Bhatia et al.

(10) Patent No.: US 10,853,373 B1
(45) Date of Patent: Dec. 1, 2020

(54) DYNAMIC DATA LAYOUTS FOR TIME-SERIES DATA

(71) Applicant: Amazon Technologies, Inc., Seattle, WA (US)

(72) Inventors: Sandeep Bhatia, Bothell, WA (US); Timothy Andrew Rath, Des Moines, WA (US); Mustafa Ozan Ozen, Vancouver (CA); Atilim Cetin, Vancouver (CA); Gaurav Gupta, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 213 days.

(21) Appl. No.: 15/980,596

(22) Filed: May 15, 2018

(51) Int. Cl.
*G06F 16/2455* (2019.01)
*G06F 16/2458* (2019.01)
*G06F 16/22* (2019.01)
*G06F 16/21* (2019.01)

(52) U.S. Cl.
CPC ...... *G06F 16/24568* (2019.01); *G06F 16/213* (2019.01); *G06F 16/221* (2019.01); *G06F 16/2477* (2019.01)

(58) Field of Classification Search
CPC .............. G06F 16/2477; G06F 16/213; G06F 16/24568
See application file for complete search history.

(56) References Cited

U.S. PATENT DOCUMENTS

| 9,110,947 | B1 * | 8/2015 | Watzke | G06F 16/24554 |
| 2006/0173878 | A1 * | 8/2006 | Bley | G06F 16/258 |
| 2016/0350375 | A1 * | 12/2016 | Das | G06F 16/24542 |
| 2017/0169082 | A1 * | 6/2017 | Bingham | G06F 9/45558 |
| 2017/0257258 | A1 * | 9/2017 | Bingham | G06F 11/301 |

OTHER PUBLICATIONS

Curino, Carlo, et al. "Automating the database schema evolution process." The VLDB Journal 22.1 (2013): 73-98. (Year: 2013).*

* cited by examiner

*Primary Examiner* — William Spieler
(74) *Attorney, Agent, or Firm* — Davis Wright Tremaine LLP (57) ABSTRACT

A data storage and retrieval system receives data points for a time series. The data storage and retrieval system stores the data points for a first portion of the time series using a first data format. Based at least in part on an analysis of queries performed on the first portion of the time series, the data storage and retrieval system determines to store a second portion of the time series using a second data format. The data storage and retrieval system stores subsequently received data points of the time series in the second data format.

20 Claims, 7 Drawing Sheets

DYNAMIC DATA LAYOUTS FOR TIME-SERIES DATA

BACKGROUND

Increasingly, data warehouse technology is called upon to store and analyze large amounts of time series data. The storage and analysis of time series data may be useful to fields such as economics, agriculture, meteorology, and numerous others. However, technology for storing and analyzing time series data is confronted with various challenges. Efficiently storing and retrieving time series data, for example, is a difficult problem due at least partly to the volume of data involved. In addition, many of the analyses performed on time series are different than those performed on conventional data. Moreover, storage and retrieval techniques adapted for other types of data may not be well suited to time-series.

BRIEF DESCRIPTION OF THE DRAWINGS

Various techniques will be described with reference to the drawings, in which.

DETAILED DESCRIPTION

Embodiments of the present disclosure are directed to storage techniques for time series data. In an embodiment, a data storage and retrieval system receives a stream of time series data. As the data is received, a data ingestion process stores the data in an initial data format. Meanwhile, a query module of the data storage and retrieval system processes requests to query the received data. The system analyzes the queries and, based on the analysis, determines that a second data format would be more suitable for storing the time series data. The system then stores data received subsequent to the determination in the second data format.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

In an embodiment, a data storage and retrieval system implements a method for storing time series data. The method comprises storing a portion of the time series in a first data format. Further, the method comprises monitoring and analyzing queries performed on the portion of the time series, and determining to store subsequent data in a second data format based at least in part on the analysis. Subsequently received data for the time series is stored using the second format. In an embodiment, previously stored portions remain stored in their respective original data formats.

In an embodiment, the second data format is selected because the data storage and retrieval system determines that it is more suitable than the first data format for processing queries performed on the current storage segment. As used herein, suitability of a data format for a subsequent portion of a time series refers to the predicted performance characteristics and storage efficiency of the data format, evaluated in view of queries executed on the current portion of the time series.

In an embodiment, a data storage and retrieval system determines that a second data format is more suitable than a first data format when analysis indicates that queries against the current storage segment would have performed more efficiently had the current storage segment used the second data format.

In an embodiment, a second data format is determined to be more suitable than a first data format when the storage efficiency of the second data format is greater than the storage efficiency of the first data format.

In an embodiment, a second data format is determined to be more suitable than a first data format when a ratio between storage efficiency and query performance would have been better in the second format than the first for queries performed on the current storage segment.

As one skilled in the art will appreciate in light of this disclosure, certain embodiments may be capable of achieving certain advantages, including some or all of the following. In an embodiment, the processing efficiency of a data storage and retrieval system is improved by adaptively storing time series data, consistent with the techniques disclosed herein. In an embodiment, consistent with the techniques disclosed herein, a data storage and retrieval system more efficiently utilizes available storage space.

Figure 1:
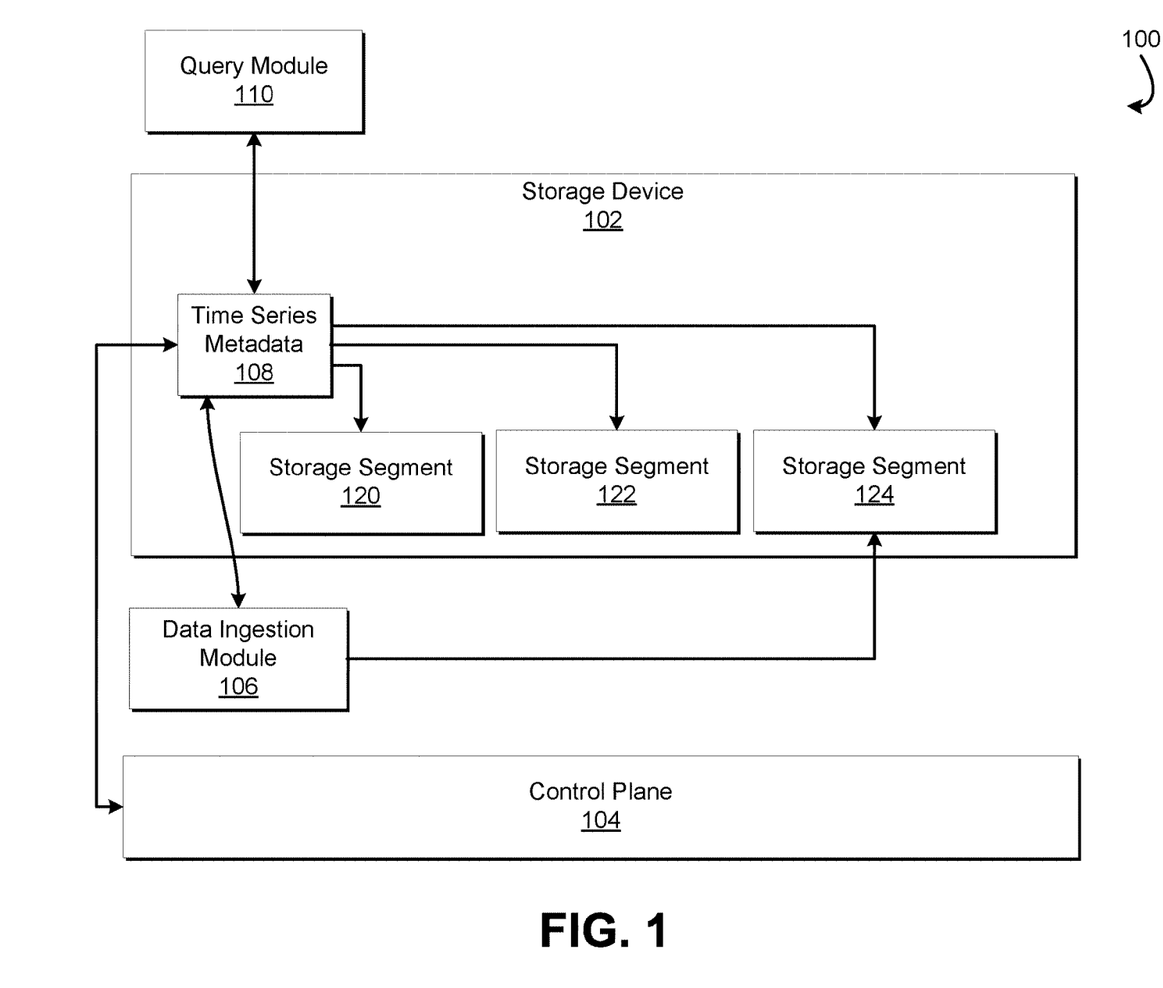
FIG. 1 illustrates an example of a data storage and retrieval system for storing time series data, in accordance with an embodiment.

FIG. 1 illustrates an example of a data storage and retrieval system for storing time series data, in accordance with an embodiment. In an embodiment, a data storage and retrieval system 100 comprises a computing device, such as an application server as described herein, with at least one processor and at least one non-transitory memory, such as described below. The at least one memory has stored thereon instructions that, as a result of being executed by the at least one processor, cause the data storage and retrieval system to perform the operations described herein. In an embodiment, these operations include those described regarding component modules of the data storage and retrieval system 100, including the depicted query module 110, data ingestion module 106, and control plane 104.

In an embodiment, a module comprises one or more memories having stored thereon processor-executable instructions which, when executed by a processor, cause the computing device to perform a computing function, such as a computing function described below.

In an embodiment, the data storage and retrieval system 100 receives time series data. A time series is a set or series of data points ordered naturally by time. A time series comprises an ordered series of data points, where each data point is associated with a monotonically increasing value. A time series thus may encompass a set of data points associated with a corresponding set of time values, a set of data points associated with a corresponding set of date-time values, a set of data points associated with corresponding set of monotonically increasing timestamp values, or a set of data points associated with corresponding set of monotonically increasing numeric values, such as a monotonically increasing serial number. An example of a time series is the data points {10, 9, 12, 14}, which might for example be associated with the corresponding times {1:00, 1:05, 1:20, 1:42}. In another example, a time series might comprise the data points {15, 26, 32}, which might be associated with the corresponding serial numbers {1, 2, 3}. It will be appreciated that these examples are intended to be illustrative, and as such should not be construed so as to limit the scope of the present disclosure to only those embodiments that include the provided examples.

In an embodiment, data for a time series is received by the data storage and retrieval system 100 in an order other than time series order. For example, data points associated with an earlier time period might be received by the system after data points associated with a later time period. In an embodiment, the data ingestion process stores out-of-order data points in a manner which supports retrieval in the correct, time-series order. For example, a data point from an earlier time might be inserted into a corresponding position in an earlier storage segment 120, 122, rather than in the current storage segment 124.

In an embodiment, the data storage and retrieval system 100 receives and stores a stream of data for a time series. A stream refers to the periodic, intermittent, or occasional receipt of data. The data storage and retrieval system 100 thus receives data points for a time series periodically, intermittently, or occasionally. Each received data point is associated with a monotonically increasing value.

In an embodiment, the computing system 100 comprises a data ingestion module 106 that receives and store time-series data. The data ingestion module 106 receives a stream of time series data and stores the received data on a storage device 102. As described herein, the data ingestion module 106 stores data for a time series on a storage device 102.

In an embodiment, the storage device 102 comprises any of a variety of storage devices, including solid-state drives, mechanical disk drives, random-access memory ("RAM"), optical storage devices, and various other storage devices capable of interfacing with a computing device.

In an embodiment, the ingestion module 106 stores the data points of a time series in storage segments 120-124. Each segment has a storage format that may be different, depending on the factors described herein, than the prior segment. The ingestion module 106 treats one of the storage segments 124 as the current segment. Data points associated with the latest time values, or highest monotonically increasing value, are placed in the current segment 124 until that segment 124 is no longer considered current.

In an embodiment, a storage segment refers to a data file stored on a storage device, such as the depicted storage device 102. In another embodiment, a storage segment is a lower-level block of storage, such as a disk sector, an erase block on a solid-state drive, or some other unit of storage.

In an embodiment, data format refers to the layout and structural encoding of the time series data. For example, in an embodiment, data for a time series may be stored encoded as a sequence of 4-byte units, each unit representing the value of a time series data point. The 4-byte units may be stored in a file that contains data for only that time series. In another example, data for the time series is encoded in 8-byte units stored in a file that stores data for multiple time series. It will be appreciated that these examples are intended to be illustrative, and should not be construed so as to limit the scope of the present disclosure to only the examples provided.

In an embodiment, the data storage and retrieval system maintains series metadata 108. The series metadata 108 comprises a record of data formats used to store each segment 120-124 of the time series. In a further aspect, the metadata 108 also comprises data indicating the range of time that is represented by each of the storage segments 120-124.

In an embodiment, the data storage and retrieval system 100 receives and executes queries. A query refers to a request to retrieve data stored by the data storage and retrieval system 100. Examples of queries include, but are not limited to, queries in structured query language ("SQL"), or any other declarative or procedural query language. The queries may involve the data points of one or more time series. For example, a query might comprise a request to retrieve all data points whose value is above a minimum threshold, and corresponding time values, for a specified interval of time. It will be appreciated that this example are intended to be illustrative, and should not be construed so as to limit the scope of the present disclosure to only the example provided.

In an embodiment, a query requests data points that span storage segments 120-124. The query module 110 processes the query based at least in part on the series metadata 108. In a further aspect, the query module 110 examines the series metadata 108 to determine which storage segments 120-124 contain the data points needed to process the query. The query module 110 then accesses data points in those segments 120-124, and assembles a result of the query. Because each storage segment may store data points using a different data format, the query module 110 accesses data points in the different data formats using information recorded in the series metadata 108.

In an embodiment, the data storage and retrieval system stores new data for a time series in a data format selected to be the current data format, based on an analysis of recently executed queries of the same time series. In an embodiment, a control plane 104 analyzes queries executed on the current data segments and selects, based on the analysis, a storage format to use for storing subsequent data points.

In an embodiment, the control plane 104 writes data to the series metadata 108 to indicate what the current storage format is. The data ingestion module 106 writes new time series data to the storage device 102 using the current format, as indicated by the series metadata 108. New time series data refers to data that conforms to the monotonic nature of the time scale, or in other words data that corresponds to a point in time that is later than any previously stored data point.

In an embodiment, the data ingestion module 106 maintains records and statistics for data that is being ingested. For example, in an embodiment, the data ingestion module 106 records how often data points for the timer series is received. These statistics may be said to refer to the density of the time series data. Note, however, that each of the storage segments 120-124 may have an associated storage density, which is indicative of how efficiently data points are stored within a given segment. Higher density of data points may, for example, correspond to higher storage efficiency.

In an embodiment, the data storage and retrieval system 100 comprises a query module 110 that processes queries of the time-series data. In an embodiment, the query module 110 maintains records and statistics for the queries that it processes. For example, in an embodiment, the query module 110 identifies which storage segments 120-124 are being accessed in order to process a query, identifies what kinds of access is occurring, and so forth.

In an embodiment, statistics pertaining to the operation of the data ingestion module 106 and the query module 110, with respect to the time series, are stored in the series metadata 108. The statistics may, for example, include how often the storage segments 120-124 are being queried, which segments are queried most frequently, how the data is being used, and so on. The statistics may also comprise ingestion statistics, such as how often new data is received, and how the new data is temporally arranged in the time series—for example, whether the data tends to be clustered around certain points, is temporally dispersed, and so forth.

In an embodiment, a control plane 104 determines when to change the current data format. In an embodiment, the control plane 104 identifies changes to the patterns of queries and/or data ingestion, based on analysis of the statistics. For example, in an embodiment, the control plane 104 analyzes the statistics and determines that the density of ingested data has been increasing while the frequency of querying the data has been decreasing. The control plane 104, based on the analysis, determines to select a new, higher-storage-density format.

In an embodiment, the control plane 104 updates the current data format indicated by the series metadata 108. The ingestion module then responds to the change by closing down the existing storage segment 124 and adding a new segment that is based on the newly selected data format. The data storage and retrieval system 100 may continue to receive data, store data, and process queries in this manner until subsequent analysis indicates that the data format should again be altered.

Figure 2:
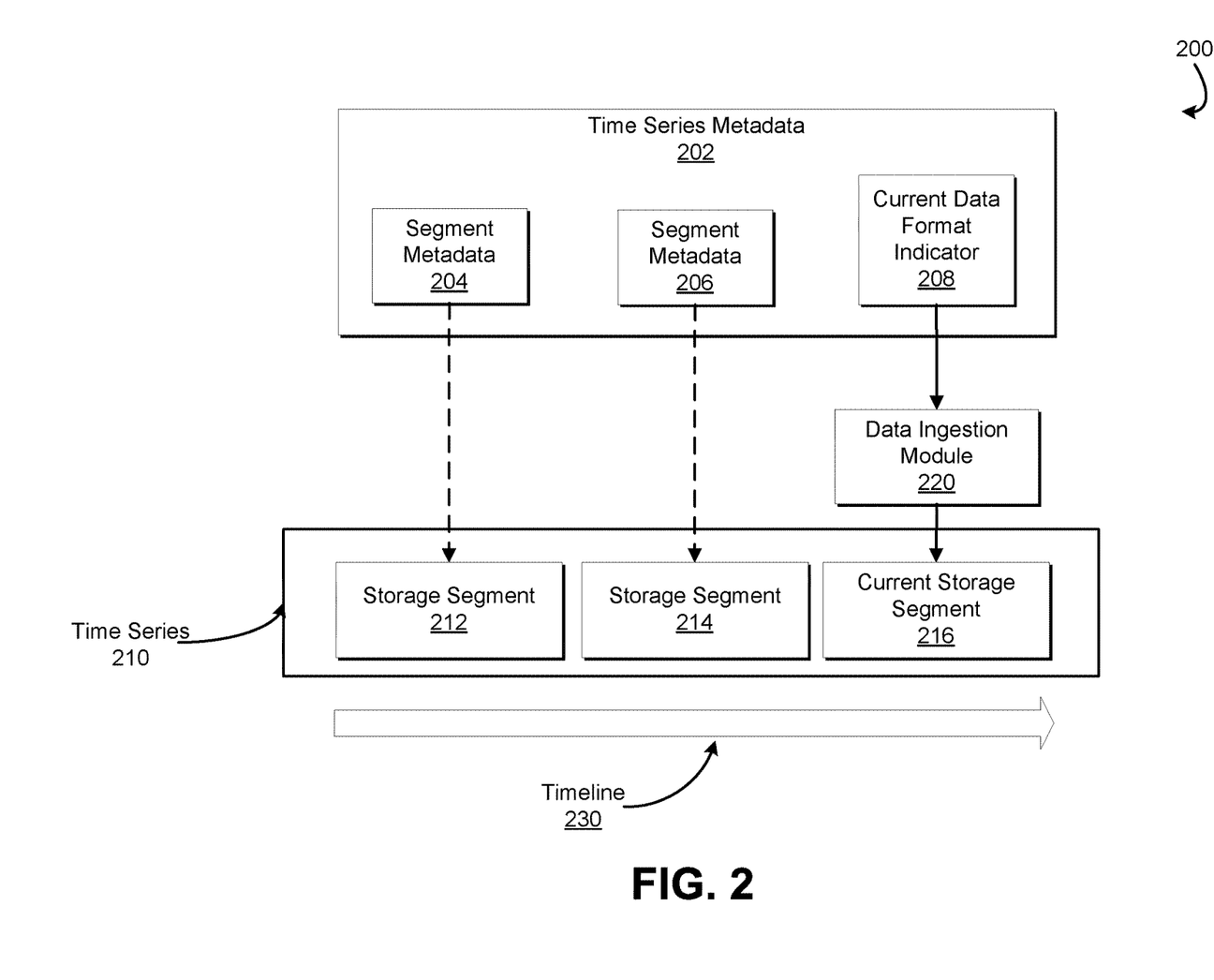
FIG. 2 illustrates an example of storing time series data, in accordance with an embodiment.

FIG. 2 illustrates an example of storing time series data, in accordance with an embodiment. In particular, the example 200 of FIG. 2 depicts a time series 210 stored as a collection of storage segments 212-216, corresponding time series metadata 202, and the operation of a data ingestion module 220 with respect to the metadata 202 and a current storage segment 216. In an embodiment, the depicted time series metadata 202, storage segments 212-216, and data ingestion module 220 correspond to the time series metadata 108, storage segments 120-124, and data ingestion module 106 depicted in FIG. 1.

In an embodiment, the series metadata 202 describes the storage formats of the time series 210. In particular, the series metadata 202 comprises segment metadata 204, 206 and a current data format indicator 208. The segment metadata 204, 206 describes the data formats used to store earlier storage segments 212, 214. The current data format indicator 208 describes the data format to be used by data ingestion module 220 for storing data in the current storage segment 216.

In an embodiment, as depicted by the timeline 230, the storage segments 212-216 are logically arranged in temporal order, with one storage segment 216 being the current storage segment to which new data is written. Additionally, in an embodiment this storage segment 216, which may be referred to as the current storage segment, is monitored with respect to the queries executed on it. In an embodiment, the selection of the next data format for the next storage segment is selected based on analysis of queries to the current storage segment.

Figure 3:
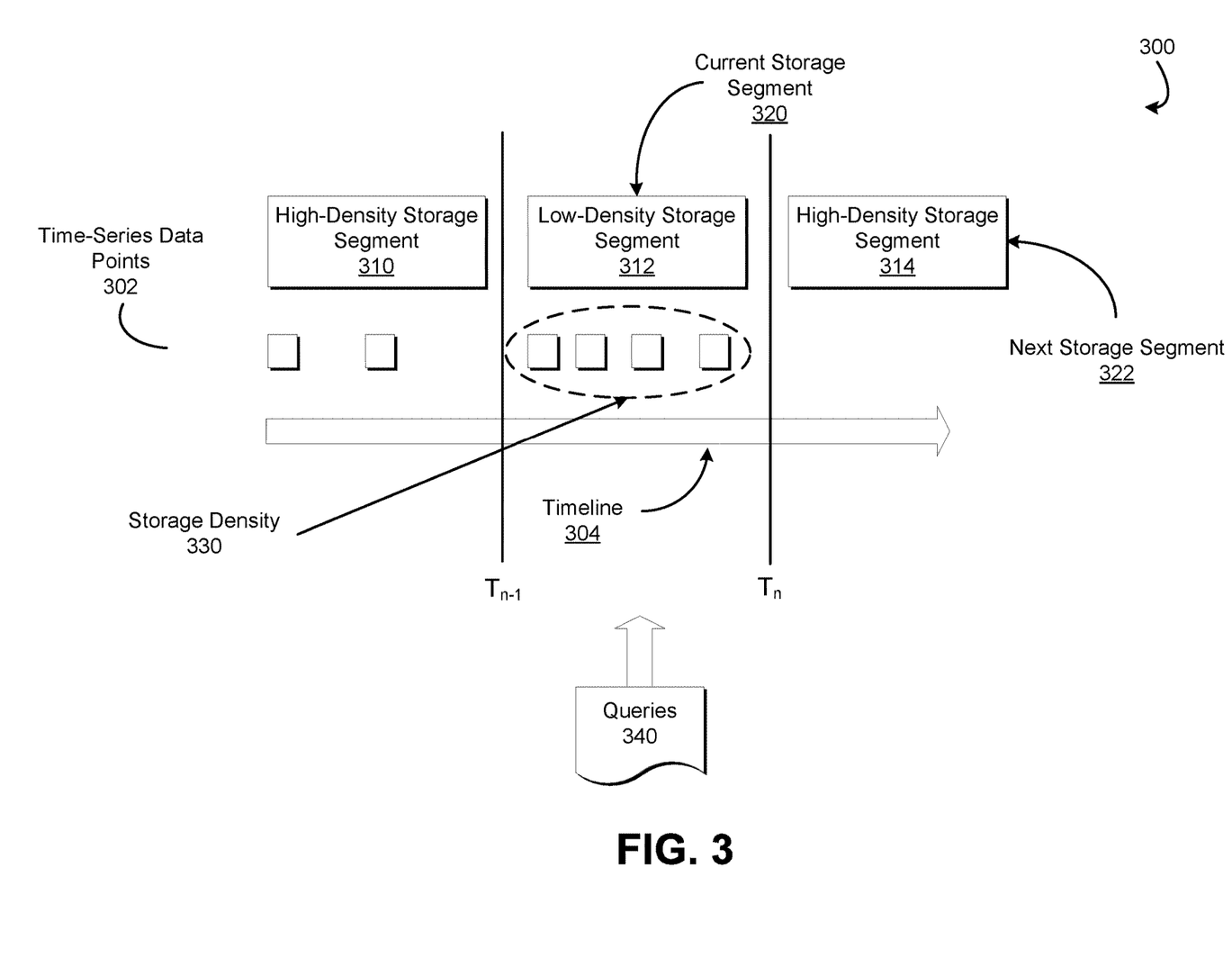
FIG. 3 illustrates an example of adapting data formats for a time series.

FIG. 3 illustrates an example 300 of adapting data formats for a time series. In the example provided by FIG. 3, data points 302 for a time series are received in accordance with a timeline 304. For the purpose of this example, the timeline 304 corresponds to the temporal order in which the data points 302 are received. Also for the purpose of this example, two reference points are depicted along the timeline. The first reference point, $T_{n-1}$, represents a time prior to the current time. The second reference point, $T_n$, represents the current time.

In an embodiment, data points are stored in accordance with the following example. Data points 302 for a time series are stored in data segments 310-314. As may be understood in view of the timeline 304 depicted in FIG. 4, the earliest storage segment 310 was the current storage segment in the time prior to Tn−1, and after that the storage segment 312 became the current storage segment 320 after the time $T_{n-1}$, before the current time $T_n$. Finally, the next storage segment 322 is to be used after $T_n$ to store new data points. As depicted in FIG. 3, the next storage segment 322 is to be a high-density storage segment 314, based at least in part on analysis of storage density 330 for the current storage segment 320.

In an embodiment, a data storage and retrieval system, such as the data storage and retrieval system 100 depicted by FIG. 1, selects a storage format based on factors including storage density 330 of the data points 302 during the interval between $T_{n-1}$ and $T_n$. In the example of FIG. 3, it may be seen that in the second interval, between $T_{n-1}$ and $T_n$, a low-density data format was used to store that interval's storage segment 312. It may also be seen, in the example provided, that the frequency of receiving data points was relatively low prior to $T_{n-1}$, and relatively high during the interval between $T_{n-1}$ and $T_n$. In an embodiment, the data storage and retrieval system selects a relatively high-density data format for the next interval, subsequent to $T_n$, due to the relatively high storage density 330 observed during the prior period.

In an embodiment, a data storage and retrieval system, such as the data storage and retrieval system 100 depicted by FIG. 1, selects a storage format based on factors including queries 340 of the data points 302 that were processed by the data storage and retrieval system during the interval between $T_{n-1}$ and $T_n$. In an embodiment, queries involving the particular data points in the current storage segment 320 are considered or weighted in the analysis. For example, the system may process many queries between the times $T_{n-1}$ and $T_n$. However, some of these may be directed to earlier data points, such as those in the storage segment 310. Others may be directed to data points in the current storage segment 320. In an embodiment, decisions regarding the data format for the next storage segment 322 are based only on those queries pertaining to data points between $T_{n-1}$ and $T_n$. For example, a query that excludes any data points after $T_{n-1}$ would not be considered, in this embodiment, while a query that includes all data points after $T_{n-1}$ would be. In such embodiments, the data format is therefore selected based on analysis of the usage of a recent portion of the particular time series, independently of any queries that might be processed regarding earlier portions of the same time series, or other time series.

In an embodiment, queries 340 of the time series are analyzed independently of queries of other time series. Likewise, in an embodiment the data storage and retrieval system selects a data format for each segment of a time series independently of the data format used for other time series.

In an embodiment, the data storage and retrieval system selects a data format based at least in part on the storage density of the second data format. In an embodiment, the selection is further based on the relative storage density of the second data format, as compared to that of the current data format.

In an embodiment, the data storage and retrieval system determines that a data format is more suitable than other data formats based at least in part on the data format including at least one additional time series. For example, if the data storage and retrieval system has determined that two time series are frequently referenced in the same query, it may determine that a multiple time series data format is more suitable than a single time series data format. For example, in another embodiment, queries 340 of the time series are analyzed with respect to correlation between other time series. Selection of a data format based on correlation between time series is further illustrated by FIG. 4, below.

In an embodiment, the data storage and retrieval system analyzes queries by identifying a change to a pattern of querying the time series. For example, an increase in the frequency with which a time series is queried is used, in an embodiment, to select a data format optimized for query performance over storage efficiency.

In an embodiment, with respect to the aforementioned examples of selecting a data format for the next storage segment 322, the operations of the data storage and retrieval system are conducted by a control plane, such as the control plane 104 illustrated in FIG. 1. In an embodiment, a control plane obtains statistics or other metrics relevant to the most recent time period (e.g., between $T_{n-1}$ and $T_n$ the example of FIG. 3). In an embodiment, the control plane obtains data ingestion statistics from the time series metadata 108, which in an embodiment are recorded by the data ingestion module 106. In another aspect, the control plane obtains query statistics from the query module 110. Additionally or alternatively, the control plane obtains query statistics recorded by the query module 110 in the time series metadata 108.

Figure 4:
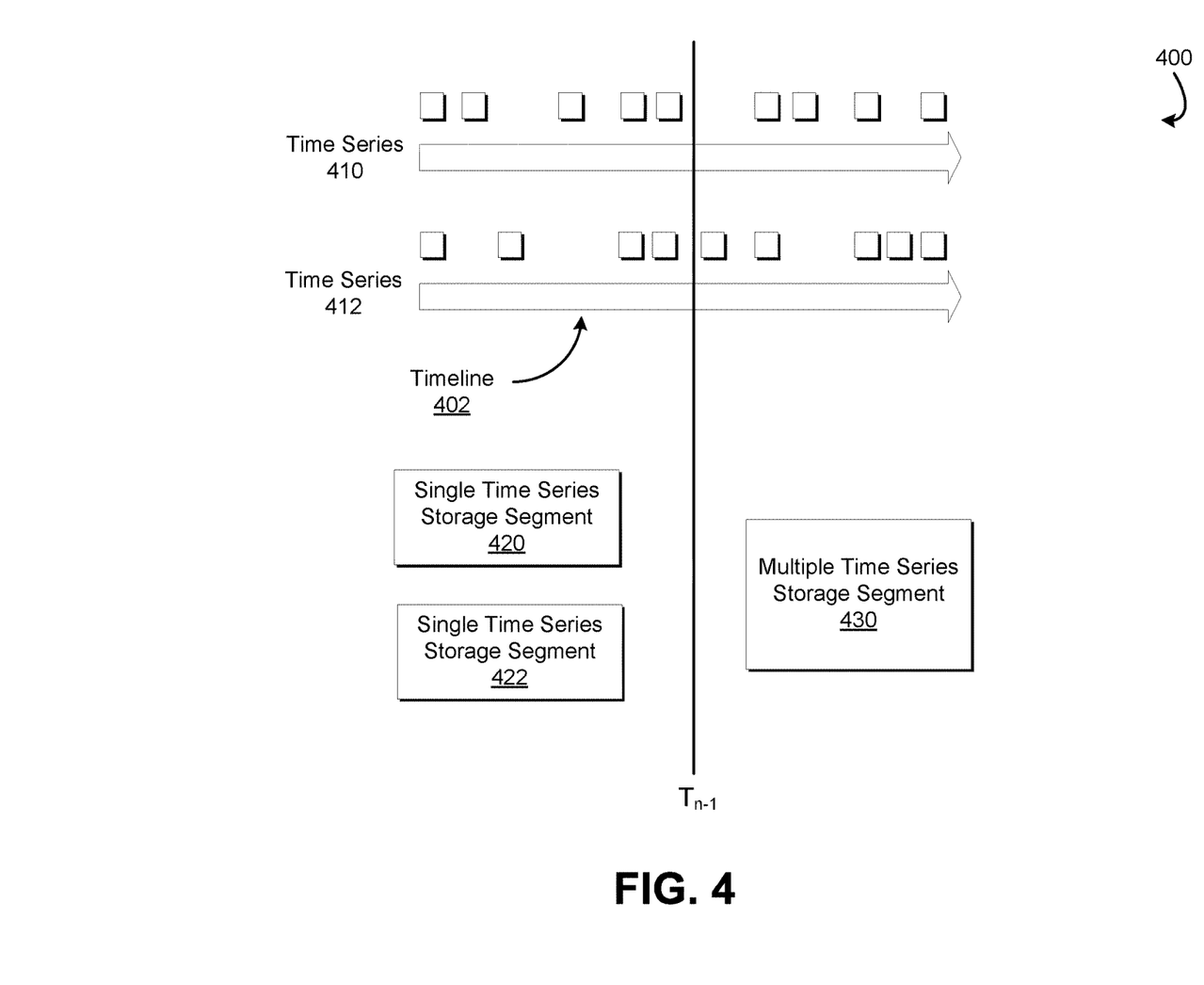
FIG. 4 illustrates an example of adapting multiple-column data formats for a time series.

FIG. 4 illustrates an example 400 of adapting multiple-column data formats for a time series. In the example 400 provided by FIG. 4, data points for two time series 410, 412 are received in accordance with a timeline 402. For the purpose of this example, the timeline 402 corresponds to the temporal order in which the data points for the two time series 410, 412 are received. Also for the purpose of this example, a reference point $T_n$ is depicted along the timeline 402. The time prior to $T_n$ represents a previous time period, $T_n$ represents the current time, and the period after $T_n$ represents a future time period.

In an embodiment, data points in the time period prior to $T_n$ are stored in accordance with the following example. Data for the first time series 410 is stored in a storage segment 420 that contains data for no other time series. Likewise, data for the second time series 410 is stored in another storage segment 422 that contains data for the time series 412, but not for any other time series. After the time period $T_n$, data points for the two time series 410, 412 are stored in a storage segment which contains data points for both the first time series 410 and the second time series 412.

In an embodiment, with respect to the aforementioned examples of selecting a data format for the storage segment 430, the operations of the data storage and retrieval system are conducted by a control plane, such as the control plane 104 illustrated in FIG. 1, using statistics and metadata relevant to the most recent time period (e.g., prior to $T_n$ the example of FIG. 4).

In an embodiment, the control plane analyzes query statistics with respect to correlation between time series. The control plan obtains query statistics from the query module 110 or the time series metadata 108. In various embodiments, the statistics obtained by the control plane include indications of time series which are frequently correlated. Correlation refers to a frequency with which time series are found together in the same query or set of related queries. For example, consider a query used to produce an X-Y chart with time along the X-axis and values for two time series along the Y-axis. These two time series could be considered correlated based on their being used in the same query.

In an embodiment, correlation is determined based an analysis of joins. For example, in an embodiment the control plane analyzes queries to determine frequently joined time series. Based on the frequency, the control plane determines that the time series are correlated.

In an embodiment, based on identified correlation, the control plane determines to store data for the next time period in a data format that stores the time series 410, 412 into a single storage segment 430. In an embodiment, storing the time series 410, 412 in the single storage segment 430 provides for increased performance for queries that correlate between the two time series.

In an embodiment, the control plane determines to store combined time-series data in the storage segment 430 based on factors other than correlation. These factors may include increasing storage efficiency, reducing administrative complexity, and so forth.

In an embodiment, data for a single time series 410 is stored in multiple segments, some of which contain data for on that time series, and some of which contain data for multiple time series. For example, in FIG. 4 the time series 410 comprises a first storage segment 420 that contains data for only that time series 410, and comprises a second storage segment 430 that combines data from the time series 410 with that of another time series 412. For example, a control plane may determine that queries have recently featured a relatively high number of correlations between time series, and decide to store future data in a segment containing data points for multiple time series. At a later time, the control plane might determine that queries do not correlate between time series as much as in the past, and then determine to store future time series data in single-time-series segments.

Figure 5:
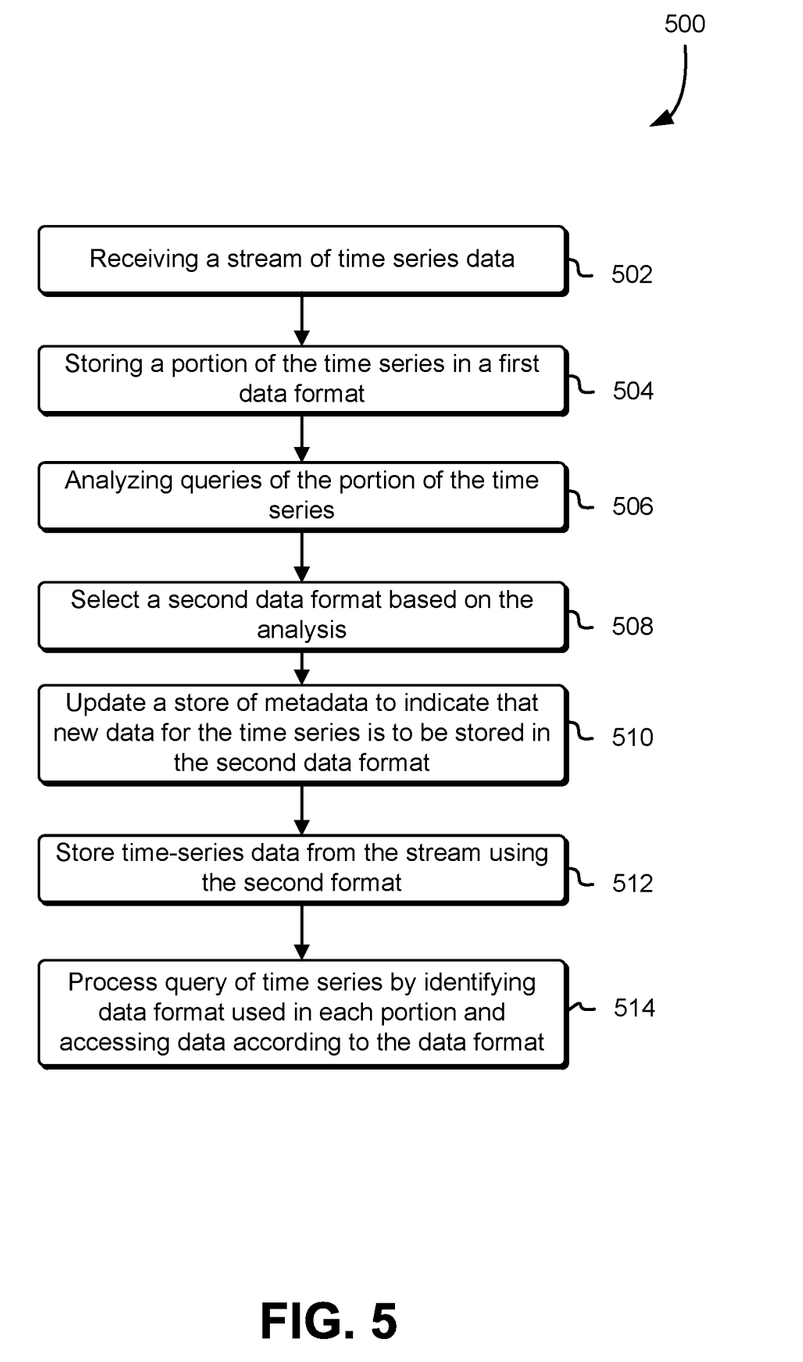
FIG. 5 illustrates an example of a procedure for storing time-series data, in accordance with an embodiment.

FIG. 5 depicts an example of a procedure for storing time-series data, in accordance with an embodiment. Although FIG. 5 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

In an embodiment, the example procedure 500 is practiced by a data storage and retrieval system, such as the data storage and retrieval system 100 depicted in FIG. 1. The depicted operations may be performed, in an embodiment, by the software modules depicted in FIG. 1, based on the execution of processor-executable instructions loaded into the memory of a computing device and executed by at least one processor of the computing device.

At step 502, the data storage and retrieval system receives a stream of time series data. In an embodiment, a data ingestion module, such as the data ingestion module 106 of FIG. 1, receives time series data and undertakes to store the received data on a storage device, such as the storage device 102 depicted in FIG. 1.

At step 504, the data storage and retrieval system stores a portion of the time series using in a first data format. In an embodiment, the data ingestion module identifies the current data format and stores newly received data points of the time series using the current format.

At step 506, the data storage and retrieval system analyzes queries of the portion of the time series. In an embodiment, aspects of the analysis are conducted by a query module, such as the query module 110 depicted in FIG. 1. The query module, in an embodiment, collects statistics on query execution and generates hints or recommendations regarding the properties of a data format that would be most suitable for processing the queries. Further examples of analyzing queries to determine suitability of a data format are given below regarding claim 6.

At step 508, the data storage and retrieval system selects a second data format based on the analysis of queries of the portion of the time series. In an embodiment, a control plane, such as the control plane 104 depicted in FIG. 1, selects a second data format based on hints or recommendations provided by the query module 110.

At step 510, the data storage and retrieval system updates a store of metadata to indicate that new data for the time series is to be stored in the second data format. In an embodiment, the control plane stores information indicative of the selected data format to a store of metadata.

At step 512, the data storage and retrieval system stores time-series data received from the stream using the second data format. In an embodiment, a data ingestion module, such as the data ingestion module 106 depicted in FIG. 1, accesses the store of metadata to determine a data format to use in storing new data, and then proceeds to store time series data according to the new format.

In an embodiment, the store of metadata may correspond to the time series metadata 108 depicted in FIG. 1. The store of metadata, in an embodiment, is maintained as a table or other data structure suitable for quickly storing and retrieving metadata for each of the various time series stored by the data storage and retrieval system.

At step 514, the data storage and retrieval system processes a query of the time series by identifying the data format used in the portions of the time series, and accessing the data according to the identified data formats. For a given time series, each unit of storage may potentially utilize a different data format, and as such each unit of storage is accessed accordingly. In an embodiment, a query module, such as the query module 110 depicted in FIG. 1, accesses the time series metadata to determine the data format used for each unit of storage, and to access the data accordingly.

Figure 6:
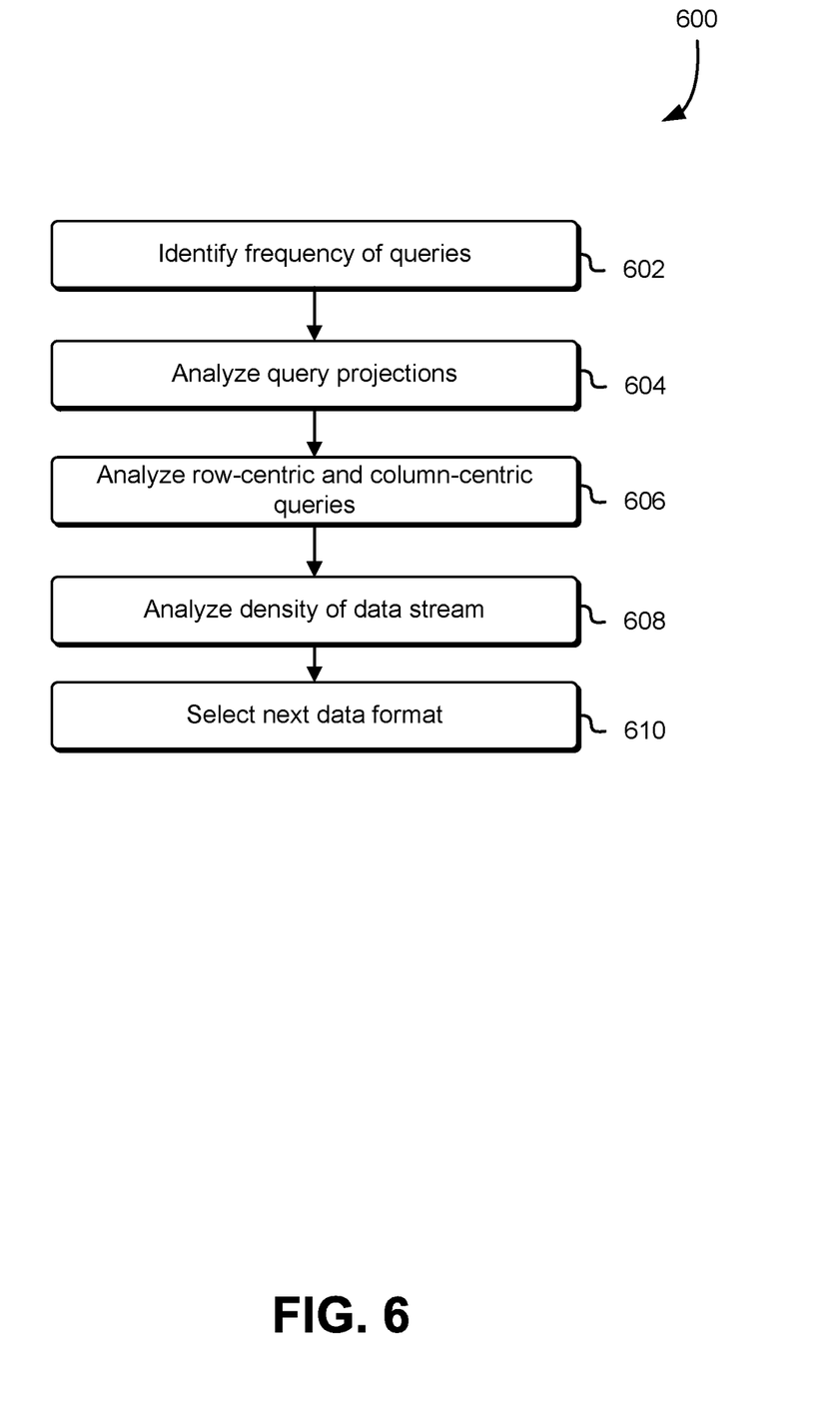
FIG. 6 illustrates an example of a procedure for selecting a data storage format, in accordance with an embodiment.

FIG. 6 illustrates an example of a procedure for selecting a data storage format, in accordance with an embodiment. Although FIG. 6 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

In an embodiment, the example procedure 600 is practiced by a data storage and retrieval system, such as the data storage and retrieval system 100 depicted in FIG. 1. The depicted operations may be performed, in an embodiment, by the software modules depicted in FIG. 1, based on the execution of processor-executable instructions loaded into the memory of a computing device and executed by at least one processor of the computing device.

At step 602, the data storage and retrieval system identifies the frequency of executed queries. In an embodiment, a query module, such as the query module 110 depicted in FIG. 1, processes queries of a time series and generates records associated with the processing, such as the number of times a particular query is executed, the number of times a query has been directed to a particular segment of a time series, and so forth.

At step 604, the data storage and retrieval system analyzes query projections. A projection is a component of query that specifies the columns or attributes of data that are to be retrieved. In an embodiment, a query module, such as the query module 110 depicted in FIG. 1, generates records of which columns or attributes are most frequently referenced in executed queries. Here, the columns or attributes are references to time series data. The query module may also generate records of which time series are most frequently included in the same projection. In an embodiment, being included in the same projection is treated as being indicative of correlation between two or more time series.

At step 606, the data storage and retrieval system analyzes queries with respect to row-centricity and column-centricity. In an embodiment, a query module, such as the query module 110 depicted in FIG. 1, determines whether executed queries tend to skew toward row-centricity or column-centricity. Row-centricity refers to queries returning a relatively small number of complete or nearly complete rows. For example, a query returning a single customer record, in the form of a complete row, is described as row-centric. Column-centricity refers to queries returning a large number of values for a small number of columns, and in particular a single column. For example, a query returning values for a single time-series might be viewed as column-centric.

In an embodiment, the data format for the subsequent portion of a time series is chosen based on row or column-centricity. For example, in an embodiment, a multicolumn data format, such as the format used for the storage multiple time series storage segment 430 of FIG. 4, is used when recent queries have been predominantly row-centric.

At step 608, the data storage and retrieval system analyzes the density of the data stream. In an embodiment, a data ingestion module, such as the data ingestion module 106 depicted in FIG. 1, records statistics regarding the frequency with which data for a time series is received. There may be periods of time in which data points for a time series are received with relatively high frequency, and periods of time in which data points are received with relatively low frequency, or not at all.

In an embodiment, selection of a data format is based at least in part on the observed storage density. For example, in an embodiment, a control plane (such as the control plane 104 depicted in FIG. 1) analyzes storage density information and selects a data format based at least in part on the analysis.

In an embodiment, a data format suitable for high-density data storage is selected when the density of the time stream has been relatively high. For example, in an embodiment an array is selected because of the suitability of arrays for high-density data storage.

In an embodiment, a data format suitable for low-density data storage is selected when the density of the time stream is relatively low. For example, in an embodiment a sparse array or sparse matrix is selected. In the former case, a sparse array is selected when each storage segment is to maintain data for a single time series, while in the latter case, a sparse matrix is selected when each storage segment is to maintain data for multiple time series.

In an embodiment, a data format is selected based on queries that perform aggregations, roll-up, drill-downs, and other similar operations. For example, in an embodiment the control plane determines that time-series data is frequently subject to roll-up or drill-down analysis patterns, and selects a data format for the next period that is suitable for this form of analysis.

In an embodiment, a data format is selected based on conformance to a service-level agreement. A service-level agreement, in an embodiment, includes criteria related to one or more of latency, storage cost, and retrieval cost. The data format is selected in response to a change to the service-level agreement, based on a prediction that the new format will better conform to the service-level agreement. In another embodiment, the data format is selected based in part on the control plane analyzing prior conformance to the service-level agreement.

At step 610, the data storage and retrieval system selects the next storage format. In an embodiment, a control plane, such as the control plane 104 depicted in FIG. 1, selects a data storage format for subsequent time series data based on one or more of the factors analyzed in steps 602-608.

Figure 7:
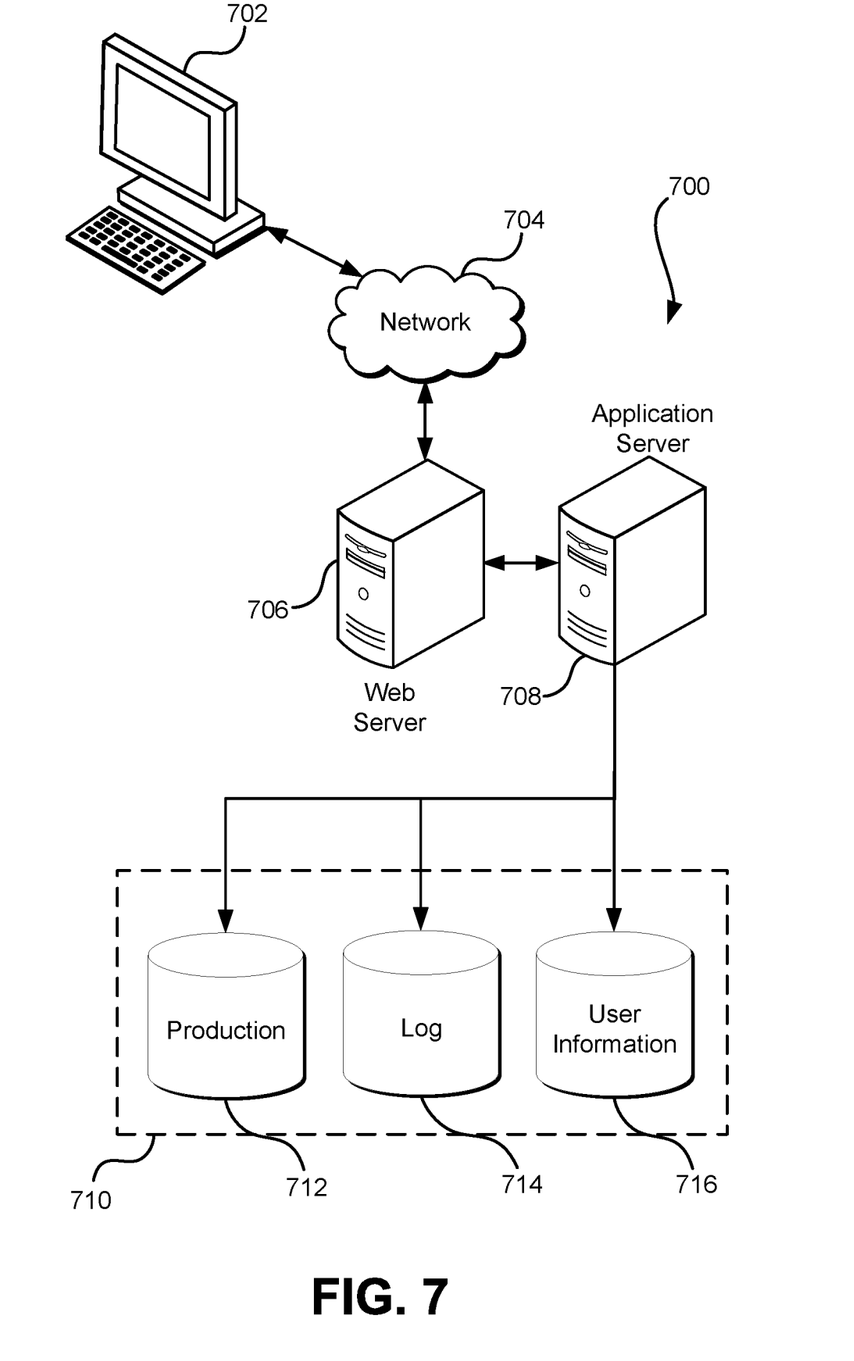
FIG. 7 illustrates a system in which various embodiments can be implemented.

In an embodiment, the data storage and retrieval system is implemented as a subsystem of the example system 700 depicted in FIG. 7. In an embodiment, a client device 702 accesses data storage and retrieval services implemented by the example system 700 on at least one web server, such as the web server 706 illustrated in FIG. 7, and at least one application server, such as the application server 708. In an embodiment, the web server 706 implements a web-service front-end to the data storage and retrieval service, and the application server(s) 708 implements a data storage and retrieval system, such as the data storage and retrieval system 100 depicted in FIG. 1.

In an embodiment, the data ingestion module 106 of FIG. 1 is supplied with a stream of real-time data via one or more of the web servers 706, or from another of the application servers 708. Likewise, queries from the client device 702 are directed via the web server 706 to an application server 708 on which a query module 110 is operating.

FIG. 7 illustrates aspects of the example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system.

Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation ("JSON"), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto and the application server 708 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk ("DVD") or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   one or more processors; and
   one or more memories to store one or more machine-readable instructions that, as a result of being performed by the one or more processors, cause the system to at least:
      store a first portion of a time series in a first data format;
      select a second data format for storing a second portion of the time series, based at least in part on a determination that the second data format is more suitable for processing queries of the first portion of the time series than the first data format;
      store the second portion of the time series in the second data format; and
      query the time series by accessing data points in the first data format and data points in the second data format.

2. The system of claim 1, the one or more memories to store further instructions which if performed by one or more processors, cause the system to at least:
   process a query of the time series by based at least in part on data points stored in the first data format and data points stored in the second data format.

3. The system of claim 1, wherein the second data format is determined to be more suitable based at least in part on storage density of the second data format.

4. The system of claim 1, wherein the second data format is determined to be more suitable based at least in part on the second data format including at least one additional time series.

5. The system of claim 1, wherein the second data format is determined to be more suitable than the first data format based at least in part on a ratio between storage efficiency and query performance of the second data format.

6. A method, comprising:
   storing a first portion of a time series in a first data format;
   determining, based at least in part on analyzing queries of the first portion of the time series, to store a second portion of the time series using a second data format;
   storing the second portion of the time series in the second data format; and
   querying the time series by accessing data points in the first data format and data points in the second data format.

7. The method of claim 6, wherein the time series is stored as a plurality of portions comprising the first portion in the first data format and the second portion in the second data format.

8. The method of claim 6, wherein the second data format is determined to be more suitable than the first data format based at least in part on storage density of the second data format.

9. The method of claim 6, wherein the second data format is determined to be more suitable than the first data format based at least in part on the second data format including at least one additional time series.

10. The method of claim 6, further comprising selecting the second data format based at least in part on density of data points in the first portion of the time series.

11. The method of claim 6, wherein analyzing queries comprises identifying correlation between the time series and at least one additional time series.

12. The method of claim 6, wherein analyzing queries comprises identifying a change in a pattern of querying the time series.

13. The method of claim 6, further comprising selecting the second data format based at least in part on row centricity and column centricity of the queries.

14. The method of claim 6, wherein accessing the data points in the first data format and the data points in the second data format is based at least in part on metadata of the time series.

15. A non-transitory computer-readable storage medium having stored thereon executable instructions that, as a result of being executed by one or more processors of a computer system, cause the computer system to at least:
    store a first portion of a time series using a first data format;
    determine, based at least in part on analysis of queries of the first portion of the time series, to store a second portion of the time series using a second data format;
    store the second portion of the time series using the second data format, and
    query the time series by at least accessing data points stored using the first data format and data points stored using the second data format.

16. The non-transitory computer-readable storage medium of claim 15, wherein the instructions further comprise instructions that, as a result of being executed by the one or more processors, cause the computer system to store the time series in plurality of portions comprising the first portion in the first data format and the second portion in the second data format.

17. The non-transitory computer-readable storage medium of claim 15, wherein the second data format is selected based at least in part on relative storage densities of the first and second data formats.

18. The non-transitory computer-readable storage medium of claim 15, wherein the second data format is selected based at least in part on correlation between time series in the analyzed queries.

19. The non-transitory computer-readable storage medium of claim 15, wherein the instructions further comprise instructions that, as a result of being executed by the one or more processors, cause the computer system to select the second data format based at least in part on density of data points in the first portion of the time series.

20. The non-transitory computer-readable storage medium of claim 15, wherein the instructions further comprise instructions that, as a result of being executed by the one or more processors, cause the computer system to select the second data format based at least in part on conformance to a service-level agreement.

* * * * *